(12) United States Patent
Terry

(10) Patent No.: X9718
(45) Date of Patent: Jun. 11, 1836

(54) PACKING SCREW, INVERTED

(76) Inventor: Stephen Terry

Stephen Terry
Letters Patent

The Schedule referred to in these Letters Patent and making part of the same containing a description in the words of the said Stephen Terry himself of his improvement in the inverted packing screw for packing cotton

---

To all to whom these presents shall come Be it known that I Stephen Terry of the County of De Kalb and State of Georgia have invented a new and useful improvement in compressing a large quantity of Cotton into a small compass for the conveniency of transportation and which improvement is denominated. "The new improved inverted Packing screw" propelled by water power and the following is a full and exact description. This Machine is placed in a frame of the following dimensions (viz.) The frame is 20 feet long 12 feet wide 15 feet high from the bottom of the sill to the top of the plate with three or more upright posts (as the workman may determine) made of timber 12 inches square except the sills which should be 12 by 14 inches. The water wheel is 5 feet in diameter made in the ordinary way of undershot water wheels with 16 buckets 2 feet 3 inches in length which is attached to a shaft 9 feet in length and 12 inches in diameter, by 2 arms 12 inches wide and 3 inches thick and 5 feet long, let through the shaft by a mortice 18 inches from the end which is to be supported on a stone pillar in the end of which there is to be a gudgeon of iron 2 inches in diameter. the other end also to run on a gudgeon 2½ inches square let into the shaft 15 inches with a round of 5 inches which must be nicely turned. with a square on the outside of the round of 8 inches and rest on a cross beam similar to the bridge of a mill. On the square end of the gudgeon there is fixed a small cogwheel 12 inches in diameter in which there are 9 cogs which work successively two other cogwheels of the following dimensions (to wit) The shaft 7 feet long and 15 inches in diameter with a gudgeon in each end which runs perpendicular the the lower end of which is fastened in a cross sill extending from
the two bottom sills and the upper end is similarly fastened in a
cross sill at the top to which shaft is attached by two arms 22 inches
wide two cog wheels each 4 feet in diameter with 32 cogs in each
with the cogs pointing inwards, the wheels to be fastened on the aforesaid
arms by bolts & screws going through each wheel and arm leaving a
space between the points of cogs of eleven inches, which two cog wheels
are is countered by the successive operation of the aforesaid cog wheel
place on the water shaft which is effected by a lever morticed in one
of the uprights of the frame by means of which the aforesaid cog wheel is
thrown at pleasure into one of the two cog wheels before mentioned when in
the cogs of either wheel it leaves a space of ¼ of an inch clear of opposite
one and then by letting the water on the wheel raises the top and pre-
pares the machine for the reception of the cotton. When raised to a
sufficient height put in the cotton raise the bridge by means of the aforesaid
lever and throw the small cog wheel into the lower cog wheel
and continue the water on the water wheel and you reverse the course
of the top and screw & pack the bag of Cotton, and upon the shaft
aforesaid immediately below the lower cog wheel to which the two
cog wheels is affixed by means of the arms. there is a wallower 15 inches
in diameter containing 9 rounds in which is a spur cog wheel attach-
ed to the lower end of the screw pin which spur wheel is eight feet
in diameter and contains 72 cogs. which wheel is fastened to the screw-
pin by 2 arms 8 feet long 4 inches wide and 3 inches thick. the arms
passing through the screw pin by mortices through the lower end of the
screw pin which is 20 inches in diameter and within eight inches
of the lower end of the screw. The screw pin is 15 feet in length and
runs perpendicular with point upwards. in the lower end of which
there is a gudgeon which works in an [illegible] which is fastened into
a sill which is 12 by 14 inches square. 12 feet of the pin is 17 inches
in diameter on which there is cut a screw thread of 5 inches rise and
runs through the top which is 2 feet 6 inches thick and 3 feet wide
and the top end of the screw is let into the bed with a round tenon
4

4 inches in length 10 inches in diameter and on the tenon there is an
iron plate ½ inch thick and of the same diameter as the tenon and
which works against a similar iron plate which is fastened in the
bottom of the mortice in the bed. The top is 7 feet 8 inches in length
to each end of which there is fastened a piece of timber 18 feet long 20
inches wide & 14 inches thick let into the top by a shoulder on three
sides leaving a space between the two pieces of 4 feet & 6 inches which
determining the length of the bale. and the two pieces of timber are
fastened at the top end by a piece of timber 18 inches wide and 4 inch
es thick which is tenoned into the two pieces with a double tenon pass-
ing through the side pieces and keyed at the outside which cap
piece form the follower, and the two side pieces before mentioned form
the end of the boxes. On the inside corners of the upright is a rabit 1½ inch
deep the lower end of the two pieces aforesaid being fastened to the top.
When the screw is put in motion the pin remains stationary and
the top, the follower and side pieces ascend and descend as the
screw is turned backwards or forwards. There is a frame fixed on
the top of first described frame which is fastened to the first described
frame lying across from one of the top plates to the other, through
which the side pieces are to pass and for the bed to rest on. in this
frame there are four uprights raised 14 feet long & 13 inches wide and
6 inches thick and places at sufficient distance for the side pieces
and follower to pass through and are confined together at the top by
two small cap plates to these posts are attached the sides of the bag
and doors and all the other necessary apparatus for packing
What I claim as my own invention and not previously known
in the foregoing described machine is the mode of applying the wa-
ter and the arrangement of all the gearing
this first day of April 1835 Stephen Terry Exd W.G.C.
Witness
Jesse C. Farren
Ephraim M. Poole 1380 [illegible]